US012719644B2

(12) United States Patent
Li et al.

(10) Patent No.: US 12,719,644 B2
(45) Date of Patent: Aug. 25, 2026

(54) REFERENCE SIGNAL FOR BEAM BLOCKAGE PREDICTION

(71) Applicant: QUALCOMM Incorporated, San Diego, CA (US)

(72) Inventors: Qiaoyu Li, Beijing (CN); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/712,537

(22) PCT Filed: Jan. 28, 2022

(86) PCT No.: PCT/CN2022/074529
§ 371 (c)(1),
(2) Date: May 22, 2024

(87) PCT Pub. No.: WO2023/141922
PCT Pub. Date: Aug. 3, 2023

(65) Prior Publication Data

US 2025/0007673 A1 Jan. 2, 2025

(51) Int. Cl.
*H04L 1/00* (2006.01)
*H04L 5/00* (2006.01)
*H04W 24/10* (2009.01)

(52) U.S. Cl.
CPC ........... *H04L 5/0057* (2013.01); *H04W 24/10* (2013.01)

(58) Field of Classification Search
CPC ..... H04W 24/10; H04W 72/20; H04W 76/28; H04L 5/0057; H04L 5/14; H04L 1/10
See application file for complete search history.

(56) References Cited

U.S. PATENT DOCUMENTS 12,114,194 B2 * 10/2024 Lee .................... H04B 7/06964
2018/0175983 A1 * 6/2018 Yum .................... H04L 5/0057
(Continued)

FOREIGN PATENT DOCUMENTS

CN 110945799 A 3/2020
CN 112567794 A 3/2021
(Continued)

OTHER PUBLICATIONS

International Search Report and Written Opinion—PCT/CN2022/074529—ISA/EPO—Sep. 22, 2022.
(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may receive a channel state information (CSI) report setting including a plurality of resource sets identifying reference signal resources, wherein each resource set is associated with a repetition parameter set to on, off, or non-presented. The UE may transmit a CSI report for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping. Numerous other aspects are described.

30 Claims, 9 Drawing Sheets

(56) References Cited

U.S. PATENT DOCUMENTS

| | | | | |
|---|---|---|---|---|
| 2020/0145866 | A1* | 5/2020 | Onggosanusi | H04B 7/088 |
| 2021/0392632 | A1 | 12/2021 | Venugopal et al. | |
| 2022/0022193 | A1* | 1/2022 | Zhang | H04B 7/06 |
| 2022/0094505 | A1* | 3/2022 | He | H04L 1/0026 |
| 2022/0311492 | A1 | 9/2022 | Wu et al. | |
| 2022/0360306 | A1* | 11/2022 | Sun | H04L 1/0027 |
| 2023/0246759 | A1* | 8/2023 | Yuan | H04L 5/0035 370/329 |
| 2024/0275551 | A1* | 8/2024 | Zheng | H04L 5/0051 |
| 2024/0364485 | A1* | 10/2024 | Hindy | H04B 7/063 |

FOREIGN PATENT DOCUMENTS

| | | | |
|---|---|---|---|
| CN | 112753188 | A | 5/2021 |
| CN | 113826429 | | 12/2021 |
| WO | 2020237619 | A1 | 12/2020 |
| WO | WO-2021159471 | A1 | 8/2021 |
| WO | 2021242604 | | 12/2021 |

OTHER PUBLICATIONS

Supplementary European Search Report—EP22922767—Search Authority—Munich—Oct. 7, 2025.

* cited by examiner

600

REFERENCE SIGNAL FOR BEAM BLOCKAGE PREDICTION

CROSS-REFERENCE TO RELATED APPLICATION

This Patent Application is a 371 national stage of PCT Application No. PCT/CN2022/074529, filed on Jan. 28, 2022, entitled "REFERENCE SIGNAL FOR BEAM BLOCKAGE PREDICTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reference signal beam blockage prediction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a channel state information (CSI) report setting including a plurality of resource sets identifying reference signal resources, wherein each resource set is associated with a repetition parameter set to on, off, or non-presented. The method may include transmitting a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

Some aspects described herein relate to a method of wireless communication performed by a base station. The method may include transmitting, to a UE, a CSI report setting including a plurality of resource sets identifying reference signal resources, wherein each resource set is associated with a repetition parameter set to on, off, or non-presented. The method may include receiving, from the UE, a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to a UE for wireless communication. The user equipment may include a memory and one or more processors coupled to the memory. The one or more processors may be configured to receive a CSI report setting including a plurality of resource sets identifying reference signal resources, wherein each resource set is associated with a repetition parameter set to on, off, or non-presented. The one or more processors may be configured to transmit a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to a base station for wireless communication. The base station may include a memory and one or more processors coupled to the memory. The one or more processors may be configured to transmit, to a UE, a CSI report setting including a plurality of resource sets identifying reference signal resources, wherein each resource set is associated with a repetition parameter set to on, off, or non-presented. The one or more processors may be configured to receive, from the UE, a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to a non-transitory computer-readable medium that stores a set of instructions for wireless communication by a UE. The set of instructions, when executed by one or more processors of the UE, may cause the UE to receive a CSI report setting including a plurality of resource sets identifying reference signal resources, wherein each resource set is associated with a repetition parameter set to on, off, or non-presented. The set of instructions, when executed by one or more processors of the UE, may cause the UE to transmit a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to a non-transitory computer-readable medium that stores a set of instructions for wireless communication by a base station. The set of instructions, when executed by one or more processors of the base station, may cause the base station to transmit, to a UE, a CSI report setting including a plurality of resource sets identifying reference signal resources, wherein each resource set is associated with a repetition parameter set to on, off, or non-presented. The set of instructions, when executed by one or more processors of the base station, may cause the base station to receive, from the UE, a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to an apparatus for wireless communication. The apparatus may include means for receiving a CSI report setting including a plurality of resource sets identifying reference signal resources, wherein each resource set is associated with a repetition parameter set to on, off, or non-presented. The apparatus may include means for transmitting a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Some aspects described herein relate to an apparatus for wireless communication. The apparatus may include means for transmitting, to a UE, a CSI report setting including a plurality of resource sets identifying reference signal resources, wherein each resource set is associated with a repetition parameter set to on, off, or non-presented. The apparatus may include means for receiving, from the UE, a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
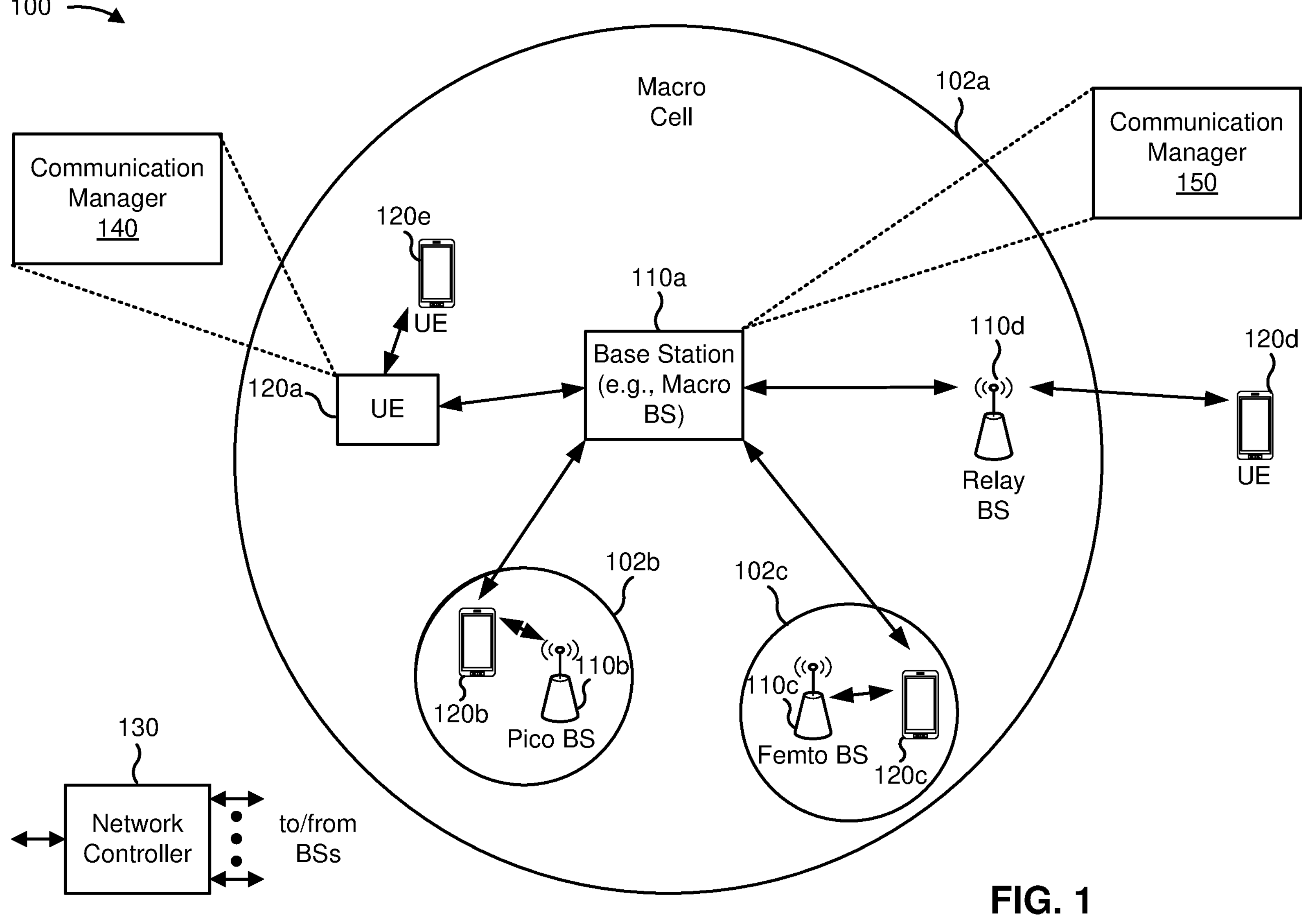
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a "BS") may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a channel state information (CSI) report setting including a plurality of resource sets identifying reference signal resources, wherein each resource set is associated with a repetition parameter set to on, off, or non-presented; and transmit a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping. Additionally, or alternatively, the communication manager 140 may perform one or more other operations described herein.

In some aspects, the base station 110 may include a communication manager 150. As described in more detail elsewhere herein, the communication manager 150 may transmit, to a UE, a CSI report setting including a plurality of resource sets identifying reference signal resources, wherein each resource set is associated with a repetition parameter set to on, off, or non-presented; and receive, from the UE, a CSI report, based at least in part on the CSI report setting and measurements of the reference signal resources, wherein the CSI report includes, for the plurality of resource sets, measurement information associated with at least one of a L1 RSRP parameter, an L1 SINR parameter, a CQI parameter, or a rank indicator parameter, wherein the measurement information identifies a rate at which a parameter is improving or dropping. Additionally, or alternatively, the communication manager 150 may perform one or more other operations described herein.

As indicated above, FIG. 1 is provided as an example. Other examples may differ from what is described with regard to FIG. 1.

Figure 2:
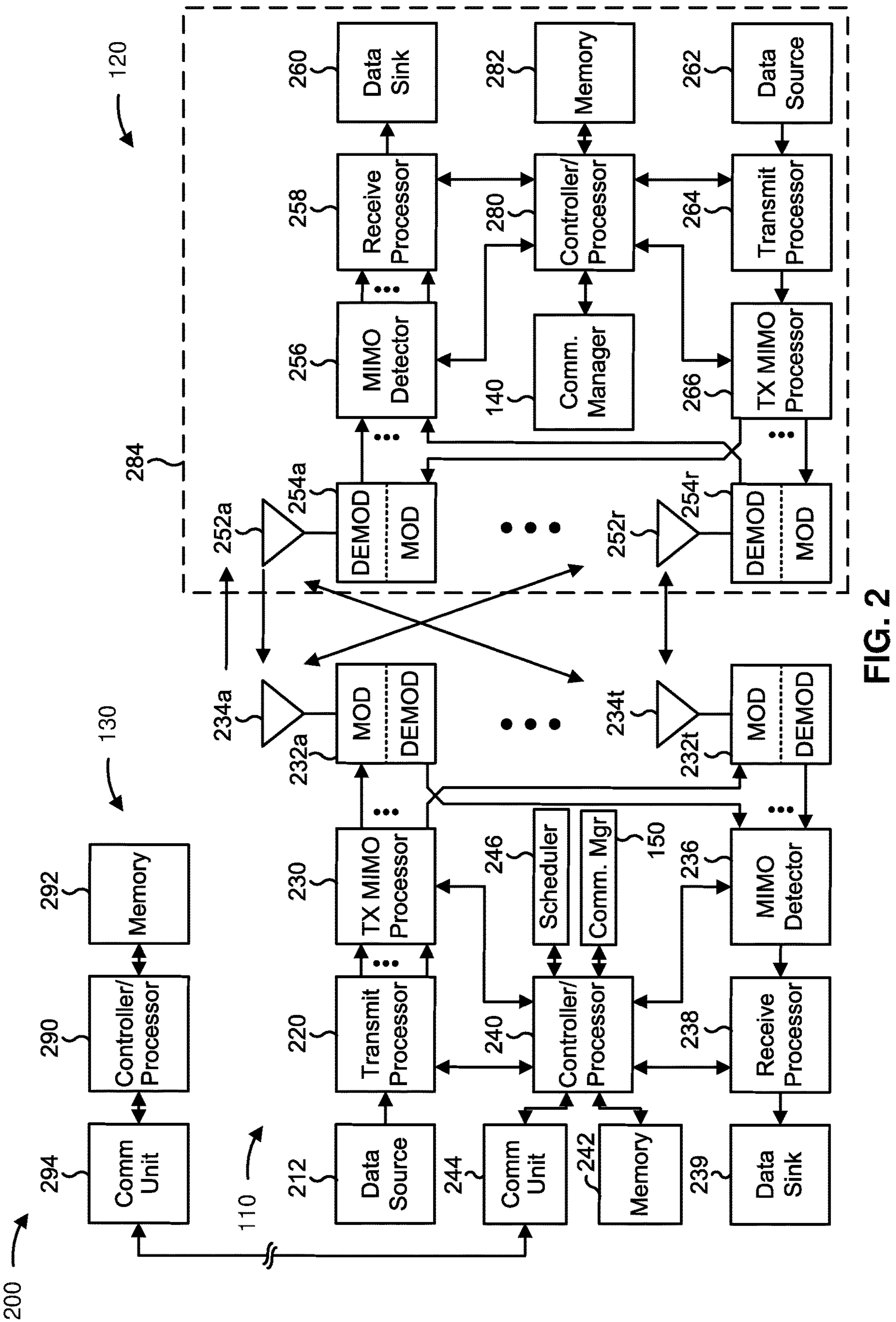
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more CQIs received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with using reference signals for beam blockage prediction, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE 120 includes means for receiving a CSI report setting including a plurality of resource sets identifying reference signal resources, wherein each resource set is associated with a repetition parameter set to on, off, or non-presented; and/or means for transmitting a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station 110 includes means for transmitting, to a UE, a CSI report setting including a plurality of resource sets identifying reference signal resources, wherein each resource set is associated with a repetition parameter set to on, off, or non-presented; and/or means for receiving, from the UE, a CSI report, based at least in part on the CSI report setting and measurements of the reference signal resources, wherein the CSI report includes, for the plurality of resource sets, measurement information associated with at least one of an L1 RSRP parameter, an L1 SINR parameter, a CQI parameter, or a rank indicator parameter, wherein the measurement information identifies a rate at which a parameter is improving or dropping. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
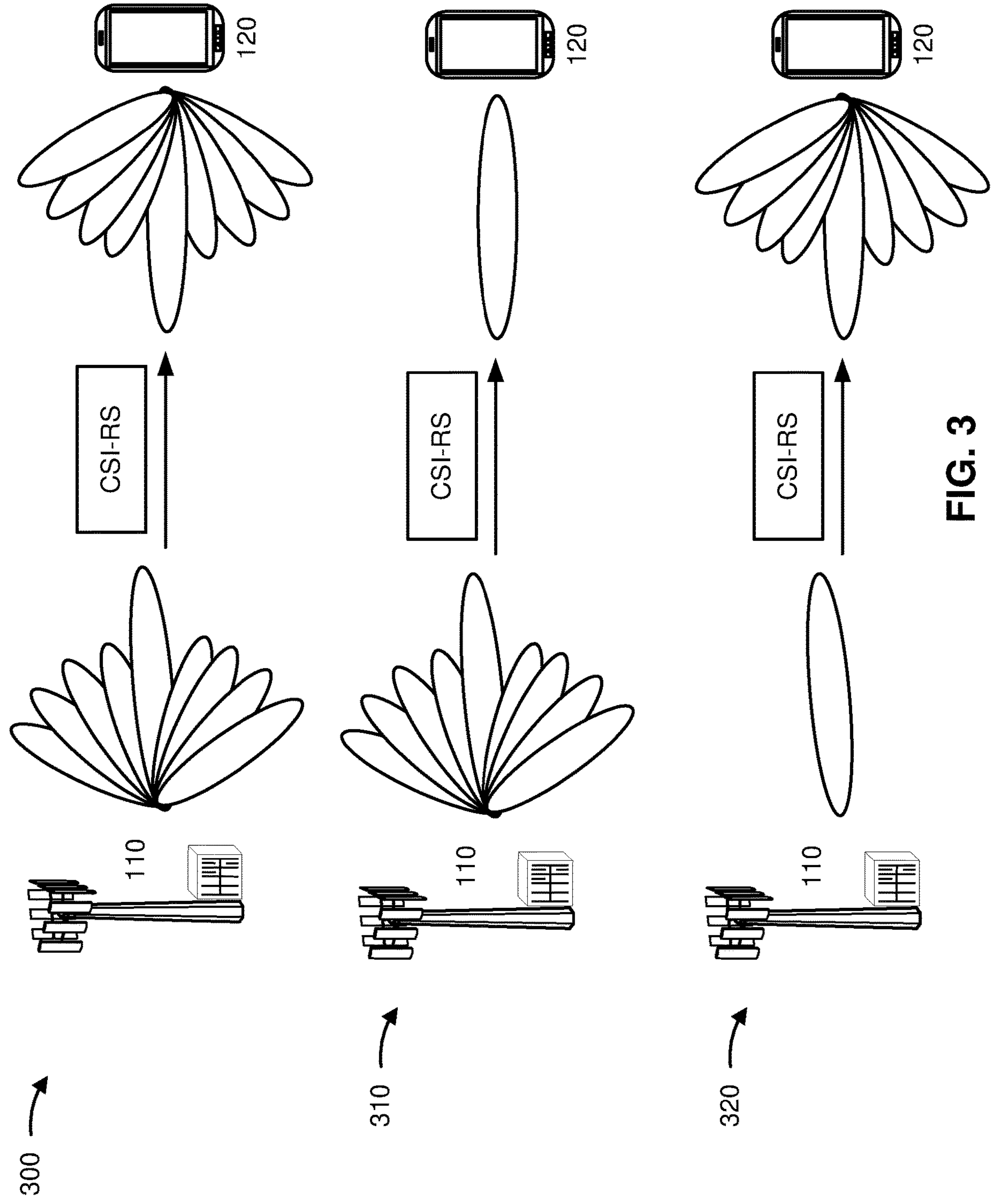
FIG. 3 is a diagram illustrating examples of channel state information (CSI) reference signal (RS) (CSI-RS) beam management procedures, in accordance with the present disclosure.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic CSI-RSs (P-CSI-RSs) (e.g., using RRC signaling), semi-persistent (SP) CSI-RSs (SP-CSI-RSs) (e.g., using media access control (MAC) control element (CE) (MAC-CE) signaling), and/or aperiodic (AP) CSI-RSs (AP-CSI-RSs) (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station 110 may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120.

As a result, the first beam management procedure may enable the UE 120 to measure a CSI-RS on different transmit beams using different receive beams to support selection of base station 110 transmit beam(s)/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above. For example, UE 120 and base station 110 may perform SSB beam sweeping (e.g., during initial access along with SSB and random access channel (RACH) association) to select a beam pair with a course granularity (e.g., by using wider, L1 beams) before performing CSI-RS beam sweeping (e.g., in a connected mode) to select a beam pair with a finer granularity (e.g., using hierarchical beam refinement, as described herein).

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a hierarchical beam refinement procedure (e.g., a P1, P2, or P3 procedure, as described herein), a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams). In some cases, beam failure recovery procedures may be used to recover a beam after a detected beam failure or radio link failure procedures may be used to identify a new beam after a detected beam or radio link failure.

In some cases, UE 120 and base station 110 may use beam prediction to reduce a quantity of beam measurements associated with selecting a beam (e.g., in one or more of the aforementioned beam management procedures). For example, when beam prediction is not used, UE 120 and base station 110 may communicate (e.g., by transmitting a CSI-RS and performing measurements and by reporting the measurements) on each beam across a beam sweep. However, when beam prediction is used, base station 110 and UE 120 may forgo transmission or measurement of one or more beams of the beam sweep. For example, for a set of consecutive beams (e.g., with regard to beam angle) that are configured for base station 110, base station 110 may forgo transmission of one or more beams within the set of consecutive beams. In this case, base station 110 may completely forgo one or more beam transmissions or may selectively transmit one or more beams (e.g., sometimes forgo one or more beam transmissions) based at least in part on whether UE 120 is performing initial access or not, based at least in part on how recently the one or more beams were transmitted, or based at least in part on a predicted beam blockage, as described herein. Additionally, or alternatively, base station 110 may transmit all of the beams in the set of consecutive beams, but UE 120 may forgo measurement of one or more beams within the set of consecutive beams. In these cases, base station 110 and/or UE 120 may interpolate (e.g., using artificial intelligence or another prediction technique) from measured beams to predict beam measurements (e.g., an RSRP) or beam blockages affecting the beam measurements for one or more beams that have not been transmitted and/or measured.

Similarly, base station 110 and/or UE 120 may forgo transmission and measurement of beams with a higher granularity. For example, rather than a first beam management procedure using wide beams and a second beam management procedure using narrow beams, base station 110 may forgo transmission and/or UE 120 may forgo measurement of the narrow beams. In this case, base station 110 and/or UE 120 may predict beam measurements for the narrow beams (e.g., that have not been transmitted and/or measured) based at least in part on beam measurements of the wide beams (e.g., that have been transmitted and measured) and/or based at least in part on past beam predictions or measurements. In these ways, base station 110 and/or UE 120 reduce a quantity of UE-side beam measurements and/or a UE-specific communication overhead, thereby improving UE performance and/or network performance.

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
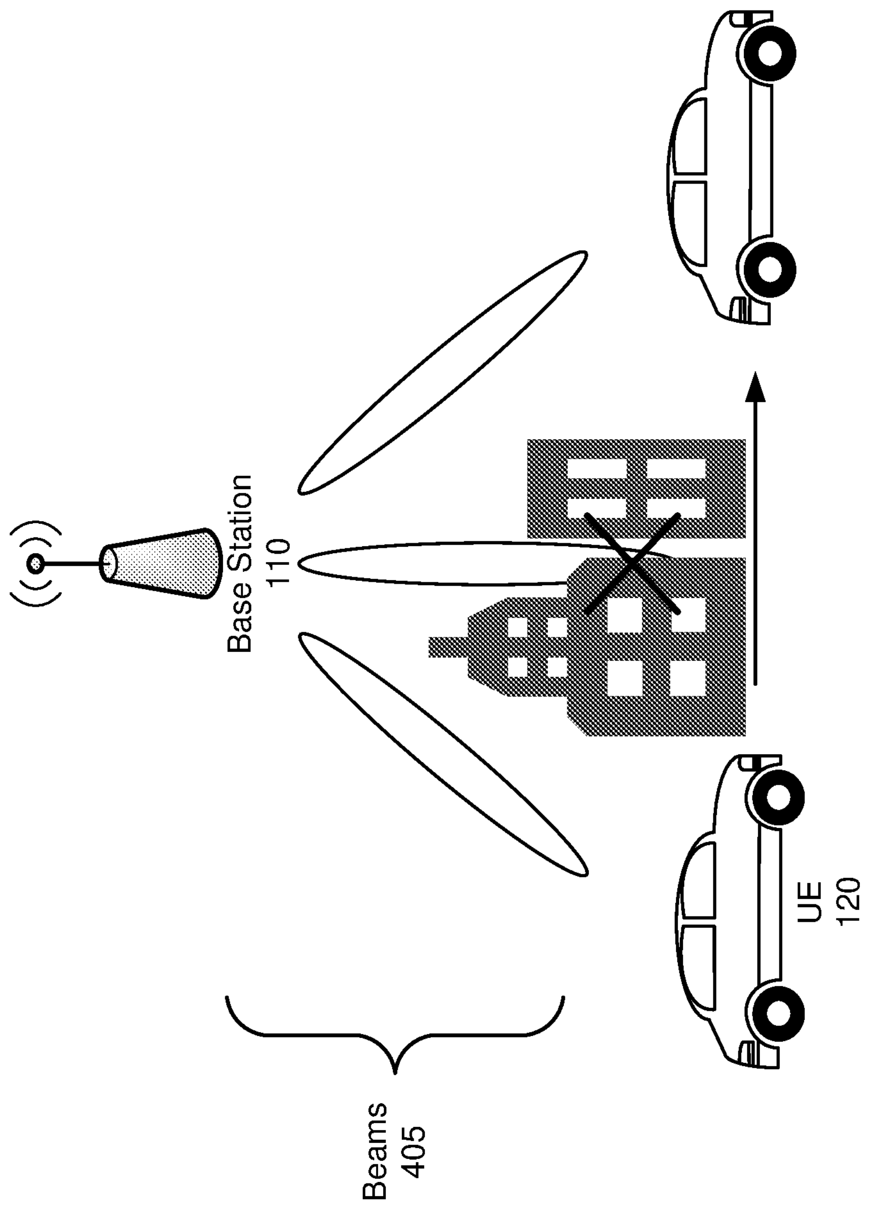
FIG. 4 is a diagram illustrating an example of beam blocking, in accordance with the present disclosure.

FIG. 4 is a diagram illustrating an example 400 of beam blocking, in accordance with the present disclosure.

As shown in FIG. 4, a base station 110 and a UE 120 may communicate with one another via one or more beams 405, which may include an uplink beam, a downlink beam, and/or a beam pair. As further shown, a beam 405 may become blocked, such as when an obstruction interrupts a propagation path of the beam 405. In example 400, a building is shown as blocking the path of a beam 405 while UE 120 (e.g., in a vehicle) is passing by the building. However, other types of obstructions may block the beam 405 in other environments or scenarios.

Beam blocking may result in an abrupt decrease (e.g., below a threshold, such as a noise floor) in the useful signal strength received for the beam 405 and/or one or more adjacent beams in a beam set that includes the beam 405. For example, UE 120 and/or base station 110 may determine a drop in an RSRP or RSSI in connection with a beam blockage. A link degradation time may refer to an amount of time for a beam metric (e.g., an RSRP or RSSI) to drop from a steady state value to a threshold value (e.g., that indicates a loss of a link) or a minimum value. Link degradation time may be expressed in terms of a time interval (e.g., a quantity of milliseconds (ms)) for an RSSI to drop to a threshold or a rate of link degradation (e.g., a quantity of decibels per millisecond (dB/ms) that an RSRP changes for a link). Different scenarios may have different link degradation times associated with beam blockage or diffraction loss, among other examples.

The degradation in signal strength may occur across the entire system bandwidth on those beams (e.g., rather than being isolated to one or more frequencies) for a duration of time. This may result in communication errors, such as dropped communications, failed reception, failed demodulation, and/or failed decoding. However, the received signal strength on other beams that are not blocked may be unaffected or may be above a threshold (e.g., the noise floor) such that beam switching to one of these beams provides a viable link between the UE 120 and the base station 110.

As shown, when the vehicle that includes UE 120 is positioned such that UE 120 is using the leftmost beam 405, UE 120 may have a relatively high signal strength. When the vehicle moves such that UE 120 is using the center beam 405, UE 120 may have a relatively low signal strength. And, when the vehicle moves such that UE 120 is using the rightmost beam 405, UE 120 may return to having a relatively high signal strength.

When beam blocking occurs, the base station 110 may modify or reconfigure communications with the UE 120, such as by performing a beam switching or beam management procedure to switch to a different beam and/or by retransmitting a communication on the blocked beam (e.g., once a blocking event has ended, such as when UE 120 is not positioned such that the propagation path of the beam 405 is blocked by a building). Additionally, or alternatively, the base station 110 may determine whether poor communication conditions with the UE 120 are due to beam blocking or are due to some other factor. This may enable the base station 110 to take appropriate corrective action. For example, the base station 110 may perform link adaptation for the beam 405 if the base station 110 determines that the beam 405 is not blocked.

Base station 110 or UE 120 may predict a beam blocking event and may use a prediction of a beam blocking event to prevent a beam failure, reduce a likelihood of the beam failure, or increase a speed of beam failure recovery (BFR) after a beam failure. A prediction of beam blocking may be based at least in part on applying machine learning techniques or statistical signal processing techniques to measurements of beams 405. Base station 110 or UE 120 may monitor one or more beams 405 or receive external assistance to monitor beams 405 (e.g., using active or passive sensing, camera-based assistant information, or approaching vehicle information received via cellular V2X (C-V2X) communication, among other examples).

As indicated above, FIG. 4 is provided merely as an example. Other examples may differ from what is described with regard to FIG. 4.

A UE may generate a CSI report and transmit the CSI report to a base station to identify a beam associated with a strongest metric using a nrofReportedRS parameter. For example, the UE may transmit a CSI report identifying a beam associated with a strongest L1-RSRP or L1-SINR among measurements of a set of beams and a set of reference signals thereon. A base station may attempt to predict a beam blockage based on the reported metric. Based on predicting a beam blockage, the base station may attempt to perform a mitigation action, such as configuring beam parameters to avoid a beam blockage, reduce a likelihood of a beam blockage, or reduce a latency time to recover from a beam blockage. However, generating a prediction using the CSI report identifying only the beam with the strongest metric may be inaccurate, resulting in an inability to effectively attempt to perform mitigation actions. Inaccurate beam blockage predictions and mitigation action attempts result in poor communication performance, excess network traffic from dropped communications or failed recovery attempts, or excess utilization of power resources from attempts to retransmit or recover as a result of beam blockages, among other examples.

Some aspects described herein enable using reference signals for more accurate beam blockage prediction. For example, a UE may be configured to report a plurality of metrics regarding a plurality of reference signals and/or beams in a beam report (e.g., a CSI report). Based at least in part on receiving information identifying the plurality of metrics (e.g., L1-RSRPs, L1-SINRs, CQIs, or rank indicator (RI) values) for a plurality of reference signals and/or beams, a base station may perform a more accurate beam blockage prediction than is achieved using a CSI report that only includes information identifying a beam with a strongest metric. Moreover, the UE may report information identifying a change in a value of a metric and/or a rate of the change in the value of the metric. By using rate of change information and/or metrics regarding weaker reference signals and/or beams (e.g., reference signals and/or beams with weaker L1-RSRPs or L1-SINRs), the base station may achieve a higher accuracy in beam blockage prediction.

In this way, based at least in part on enhancing beam reporting to identify metrics associated with a plurality of reference signals and/or beams and/or including rate of change information in the beam report, a base station and/or a UE may achieve a more accurate beam blockage prediction, thereby improving an accuracy of mitigation action attempts by the base station and/or the UE. By improving an accuracy of beam blockage mitigation action attempts, the base station and/or the UE improve communication performance, reduce an amount of network traffic, or reduce a utilization of power resources relative to mitigation action attempts associated with other techniques for beam blockage prediction.

Figure 5:
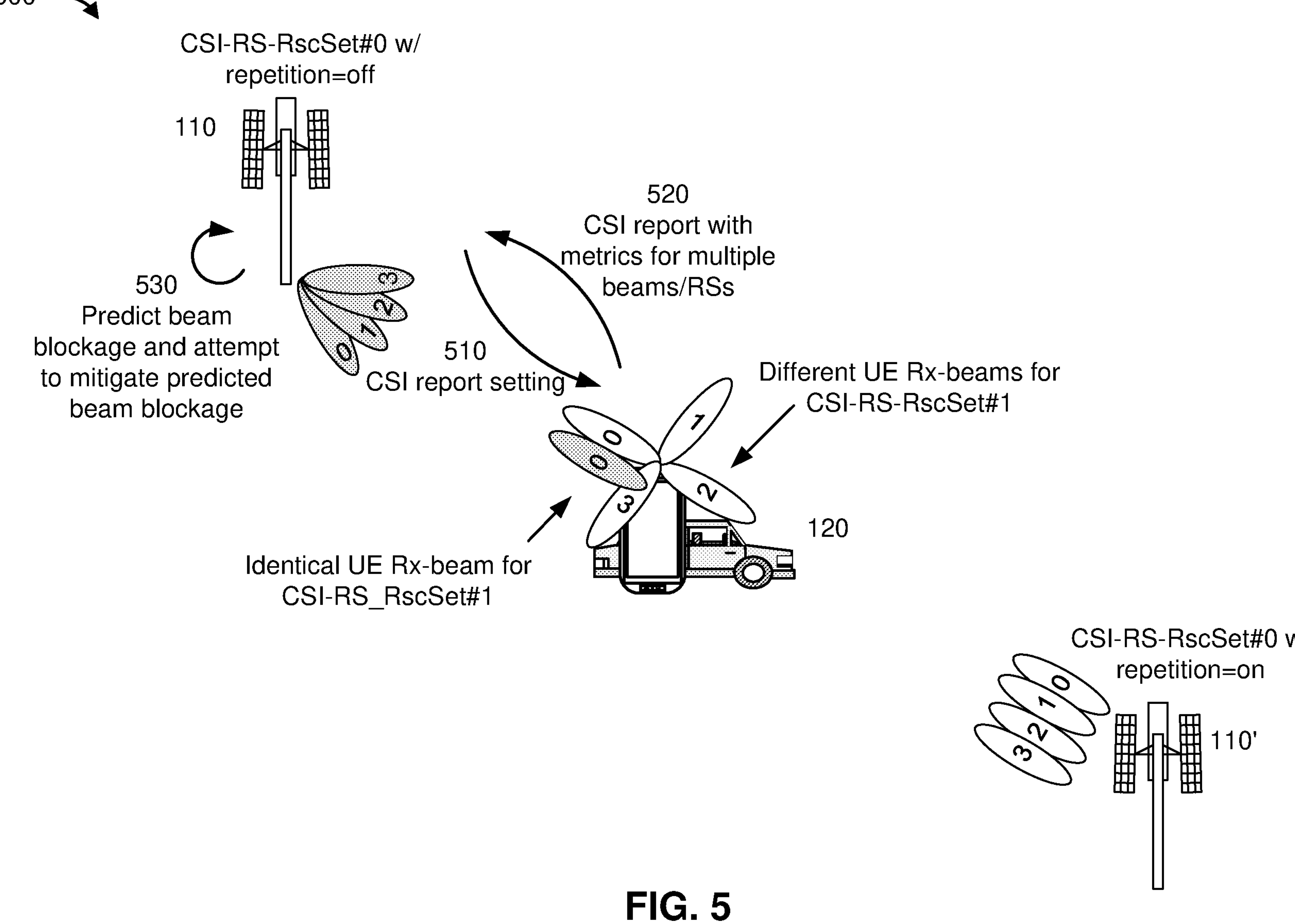
FIG. 5 is a diagram illustrating an example associated with using a reference signal for beam blockage prediction, in accordance with the present disclosure.

FIG. 5 is a diagram illustrating an example 500 associated with using a reference signal for beam blockage prediction, in accordance with the present disclosure. As shown in FIG. 5, example 500 includes communication between base stations 110/110' and a UE 120. In some aspects, the base stations 110' and the UE 120 may be included in a wireless network, such as wireless network 100. The base stations 110' and the UE 120 may communicate via a wireless access link, which may include an uplink and a downlink.

As further shown in FIG. 5, and by reference numbers 510 and 520, the UE 120 may receive a CSI report setting from the base station 110 and may transmit a CSI report in accordance with the CSI report setting. For example, the base station 110 may configure UE 120 with a CSI report configuration (a parameter "CSI-ReportConfig") with which to report a plurality of metrics. The plurality of metrics may include a plurality of L1-RSRPs, L1-SINRs, CQIs, RIs, or a combination thereof, among other examples. Additionally, or alternatively, the plurality of metrics may include information identifying a rate of change of a plurality of metrics. In other words, the plurality of metrics may include whether a metric is increasing or decreasing or a rate of change of the metric over time for a plurality of reference signals or beams. As an example, the base station 110 may configure the UE 120 to report a plurality of L1-RSRPs for a plurality of reference signals, whether each beam or reference signal of a plurality of beams or reference signals is associated with an increasing or decreasing L1-RSRP, or a rate at which an L1-RSRP value is increasing or decreasing for each beam or reference signal of the plurality of beams or reference signals. In some aspects, the base station 110 may configure the UE 120 to report stored (e.g., a historic/previously measured) metrics for a set of beams or reference signals. In some aspects, the base station 110 may configure the UE 120 to report predicted metrics for a set of beams or reference signals. For example, the UE 120 may predict a future L1-RSRP value using a prediction algorithm and may report the predicted L1-RSRP value and/or whether the predicted L1-RSRP value is an increased or decreased value relative to a current L1-RSRP value.

In some aspects, the base station 110 may configure the UE 120 with a value for a repetition parameter. For example, the base station 110 may configure the repetition parameter as 'on' or 'off.' Additionally, or alternatively, the repetition parameter may have a value of 'non-presented' (which may also be referred to as 'not-presented'). Other possible configurations for the repetition parameter are contemplated. In some aspects, the base station 110 may configure one or more thresholds for reporting. For example, the base station 110 may transmit RRC signaling configuring a rate threshold. In this case, when the UE 120 determines that a metric is increasing or decreasing at a rate that satisfies the rate threshold, the UE 120 may report the metric and/or the satisfaction of the threshold to the base station 110.

As an example, as shown, the UE 120 may be configured with different UE Rx beams for a first CSI reference signal (CSI-RS) resource set (CSI-RS-RscSet #0) for receiving reference signals from the base station 110, which has the repetition parameter set to 'off.' In contrast, the UE 120 may be configured with another set of different UE Rx beams for a second CSI-RS resource set (CSI-RS-RscSet #1). In this case, the UE 120 may be configured to receive the same Rx beams (beam 0) from the base stations 110/110'. In another example, the UE 120 may be configured to receive the same Rx beam for a plurality of CSI-RS resource sets (e.g., a set of beams with the same parameters or transmission configuration indicator (TCI) state).

In some aspects, the UE 120 may report a rate of change of a metric in a beam report based at least in part on a configuration transmitted to the UE 120 from the base station 110. For example, base station 110 may configure the UE 120 to report whether an L1-RSRP is increasing or decreasing (and/or a rate of change thereof) for a plurality of non-zero power (NZP) CSI-RS (NZP-CSI-RS) resource sets ('NZP-CSI-RS-ResourceSet'). Additionally, or alternatively, the base station 110 may configure the UE 120 to report whether a metric is decreasing or increasing for a plurality of CSI-SSB resource sets ('CSI-SSB-ResourceSet'). In some aspects, the plurality of NZP-CSI-RS resource sets or CSI-SSB resource sets include one or more CSI resource configurations ('CSI-ResourceConfig') associated with a CSI report configuration ('CSI-ReportConfig'). In some aspects, the decreasing or increasing values and/or rates of change of a metric of an NZP-CSI-RS resource set or a CSI-SSB resource set is based at least in part on measurements of a plurality of different CSI-RS or SSB (e.g., CSI-SSB) resources associated with the NZP-CSI-RS resource set or the CSI-SSB resource set. In other words, the UE 120 may determine and report a rate of change for an L1-RSRP based at least in part on measurements of a plurality of different CSI-RSs of a single NZP-CSI-RS resource set.

In some aspects, the base station 110 may configure the UE 120 to receive using different Rx beams. For example, the base station 110 may configure the UE 120 with a plurality of TCI states (e.g., downlink (DL) TCI state, an uplink (UL) TCI state, or a DL/UL common TCI state (which may be referred to as a "common TCI state") to identify different Rx beams associated with different CSI-RS resources (of different CSI-RS resource sets) that the UE 120 is to monitor. In this case, when a repetition parameter is set to 'on,' the UE 120 may be configured to determine a metric for different CSI-RS resource sets within an NZP-CSI-RS resource set. In some aspects, the base station 110 may configure the UE 120 for resource-specific reporting. For example, when the repetition parameter is set to 'on,' the UE 120 may be configured to identify different Rx beams determined based at least in part on a configured or indicated TCI state associated with different CSI-RS resources. In some aspects, the UE 120 may receive, from the base station 110, dynamic signaling (e.g., in association with a CSI report configuration) identifying a TCI state (e.g., a DL TCI state, a UL TCI state, or a DL/UL common TCI state) for determining an Rx beam associated with CSI-RS or CSI-SSB resources for measurement.

In this case, the UE 120 may use the identified different Rx beams to determine the metric for different CSI-RS resource sets within an NZP-CSI-RS resource set. In some aspects, the base station 110 may configure a plurality of TCI states on a per CSI-RS resource basis. For example, the UE 120 may be configured such that each CSI-RS resource, of a group of CSI-RS resources, is associated with a plurality of optional TCI states. In this case, the UE 120 may select one or more of the plurality of optional TCI states to determine an Rx beam for measurement and reporting. Further, the UE 120 may report the selected optional TCI state in connection with providing reporting regarding the determined and measured Rx beam.

In some aspects, the base station 110 may configure the UE 120 to receive using a set of the same Rx beams (e.g., Rx beams with the same parameters across, for example, different resources). For example, when the repetition parameter is set to 'off' or 'non-presented,' the UE 120 may be configured with one or more TCI states to determine a single Rx beam associated with different CSI-RS or CSI-SSB resources. In this case, the UE 120 may use the single Rx beam to determine a metric associated with different CSI-RS resources within an NZP-CSI-RS resources set. In some aspects, the base station 110 may configure the UE 120 to perform resource-specific reporting when the repetition parameter is set to 'off' or 'non-presented'. For example, the UE 120 may be configured to use a set of the same Rx beams (e.g., configured based at least in part on a TCI state associated with a CSI-RS or CSI-SSB resource that the UE 120 is to monitor) for determining a metric associated with different CSI-RS resources within an NZP-CSI-RS resource set. In some aspects, when the repetition parameter is set to 'off' or 'non-presented,' the UE 120 may be configured with a plurality of optional TCI states to determine an Rx beam for measurement and report, and the UE 120 may report a selected optional TCI state in connection with providing the reporting.

In some aspects, the UE 120 may consolidate a plurality of metrics into a single beam report (e.g., a CSI report). For example, the UE 120 may be configured to consolidate determinations of a metric (e.g., whether an L1-RSRP is increasing or decreasing) across a plurality of different CSI-RS resources within the same CSI-RS resource set or within a plurality of different CSI-RS resource sets. Similarly, the UE 120 may consolidate determinations of the metric across a plurality of SSB resources within the same CSI-SSB resource set or within a plurality of different SSB resource sets.

In some aspects, the UE 120 may use an analytical consolidation scheme (e.g., an averaging scheme, a weighted averaging scheme, or a filtering scheme, among other examples) with inputs including the metrics (e.g., measurements of the L1-RSRP or whether an L1-RSRP is increasing or decreasing for a set of beams across a set of time intervals). Additionally, or alternatively, the UE 120 may use an artificial intelligence based model to consolidate a plurality of metrics into a single beam report. For example, the UE 120 may use the metrics, a selected TCI state, or a selected beam, among other examples as inputs to a neural network based model or a machine learning based model that is configured based at least in part on received signaling from the base station 110. In some aspects, the base station 110 may transmit dynamic signaling to the UE 120 to configure which consolidation scheme (e.g., an analytical consolidation scheme or an artificial intelligence based model consolidation scheme) and/or one or more parameters thereof. For example, the base station 110 may transmit dynamic signaling (e.g., DCI or MAC-CE signaling) to set or adjust a set of weights for averaging, a set of filter coefficients, a set of model coefficients, a set of model structures, a set of inputs, or a set of outputs.

As further shown in FIG. 5, and by reference number 530, the base station 110 may predict a beam blockage and attempt to mitigate a predicted beam blockage. For example, base station 110 may use the information included in a CSI report received from the UE 120 as well as information received from, for example, other UEs 120 to predict a beam blockage. In this case, based at least in part on predicting a beam blockage, the base station 110 may attempt to perform a beam blockage mitigation action, such as by adjusting a beam or a configuration of the UE 120 to avoid a beam blockage, reduce a likelihood of a beam blockage, or reduce a latency in recovering from a beam blockage.

As indicated above, FIG. 5 is provided as an example. Other examples may differ from what is described with respect to FIG. 5.

Figure 6:
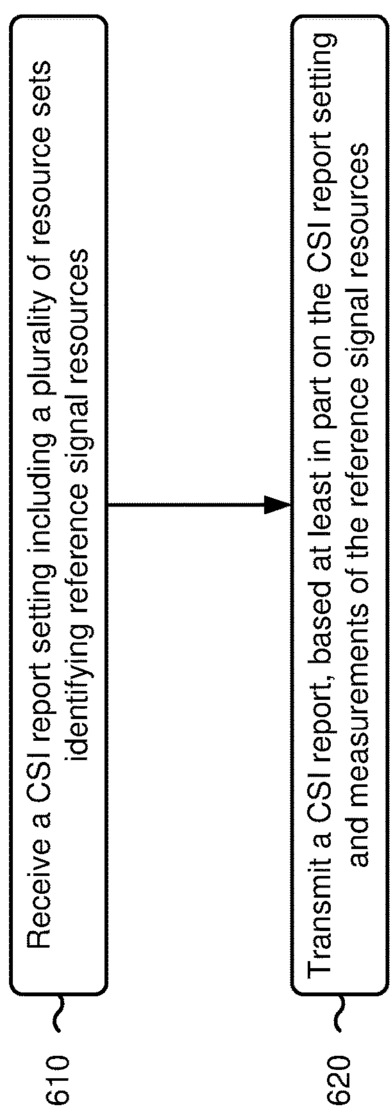
FIGS. 6-7 are diagrams illustrating example processes associated with using a reference signal for beam blockage prediction, in accordance with the present disclosure.

FIG. 6 is a diagram illustrating an example process 600 performed, for example, by a UE, in accordance with the present disclosure. Example process 600 is an example where the UE (e.g., UE 120) performs operations associated with using reference signals for beam blockage prediction.

As shown in FIG. 6, in some aspects, process 600 may include receiving a CSI report setting including a plurality of resource sets identifying reference signal resources (block 610). For example, the UE (e.g., using communication manager 140 and/or reception component 802, depicted in FIG. 8) may receive a CSI report setting including a plurality of resource sets identifying reference signal resources, wherein each resource set is associated with a repetition parameter set to on, off, or non-presented, as described above.

As further shown in FIG. 6, in some aspects, process 600 may include transmitting a CSI report, based at least in part on the CSI report setting and measurements of the reference signal resources (block 620). For example, the UE (e.g., using communication manager 140 and/or transmission component 804, depicted in FIG. 8) may transmit a CSI report, based at least in part on the CSI report setting and measurements of the reference signal resources, wherein the CSI report includes, for the plurality of resource sets, measurement information associated with at least one of a L1 RSRP parameter, an SINR parameter, a CQI parameter, or a rank indicator parameter, wherein the measurement information identifies a rate at which a parameter is improving or dropping, as described above.

Process 600 may include additional aspects, such as any single aspect or any combination of aspects described below and/or in connection with one or more other processes described elsewhere herein.

In a first aspect, the plurality of resource sets includes at least one of an NZP-CSI-RS Resource Set or an SSB Resource Set.

In a second aspect, alone or in combination with the first aspect, the repetition parameter is set to on and wherein the UE is configured with a plurality of transmission configuration indicator states from which to determine one or more reception beams associated with the reference signal resources.

In a third aspect, alone or in combination with one or more of the first and second aspects, the repetition parameter is set to on and wherein the measurement information, for a resource set of the plurality of resource sets, is based at least in part on a plurality of different reception beams corresponding to one or more transmission configuration indicator states associated with different reference signal resources.

In a fourth aspect, alone or in combination with one or more of the first through third aspects, the UE is configured to determine a receive beam based at least in part on a plurality of transmission configuration indicator states of a reference signal resource of the reference signal resources, and process 600 includes reporting a transmission configuration indicator state, of the plurality of transmission configuration indicator states, of the determined receive beam.

In a fifth aspect, alone or in combination with one or more of the first through fourth aspects, the repetition parameter is set to off or non-presented and wherein the UE is configured with one or more transmission configuration indicator states from which to determine a reception beam associated with the reference signal resources.

In a sixth aspect, alone or in combination with one or more of the first through fifth aspects, the repetition parameter is set to off or non-presented and wherein the measurement information, for a resource set of the plurality of resource sets, is based at least in part on a reception beam corresponding to one or more transmission configuration indicator states associated with the reference signal resources.

In a seventh aspect, alone or in combination with one or more of the first through sixth aspects, the UE is configured to select, from a plurality of transmission configuration indicator states configured for a resource set, a reception beam, and process 600 includes reporting a transmission configuration indicator state of the selected reception beam.

In an eighth aspect, alone or in combination with one or more of the first through seventh aspects, the UE is configured to consolidate the measurement information across the reference signal resources of the plurality of resource sets.

In a ninth aspect, alone or in combination with one or more of the first through eighth aspects, consolidated measurement information is generated based at least in part on an analytical function with the measurement information as an input, wherein the analytical function includes at least one of an averaging function, a weighting function, or a filtering function.

In a tenth aspect, alone or in combination with one or more of the first through ninth aspects, consolidated measurement information is generated based at least in part on an application of an artificial intelligence model or a machine learning model with the measurement information as an input.

In an eleventh aspect, alone or in combination with one or more of the first through tenth aspects, the artificial intelligence model or the machine learning model is a neural network based model.

In a twelfth aspect, alone or in combination with one or more of the first through eleventh aspects, a selected transmission configuration indicator state associated with a selected reception beam is another input to the artificial intelligence or machine learning model.

In a thirteenth aspect, alone or in combination with one or more of the first through twelfth aspects, process 600 includes receiving, in connection with the CSI report setting, information identifying a transmission configuration indicator state to determine a reception beam associated with the reference signal resources.

In a fourteenth aspect, alone or in combination with one or more of the first through thirteenth aspects, process 600 includes receiving, in connection with the CSI report setting, radio resource control signaling identifying a quantity of parameter rates to report in the measurement information, or dynamic signaling updating the quantity of parameter rates to report in the measurement information.

In a fifteenth aspect, alone or in combination with one or more of the first through fourteenth aspects, process 600 includes receiving, in connection with the CSI report setting, information indicating or updating a reporting scheme for consolidating the measurement information.

In a sixteenth aspect, alone or in combination with one or more of the first through fifteenth aspects, the plurality of resource sets is associated with one or more CSI resource configurations associated with the CSI report setting.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
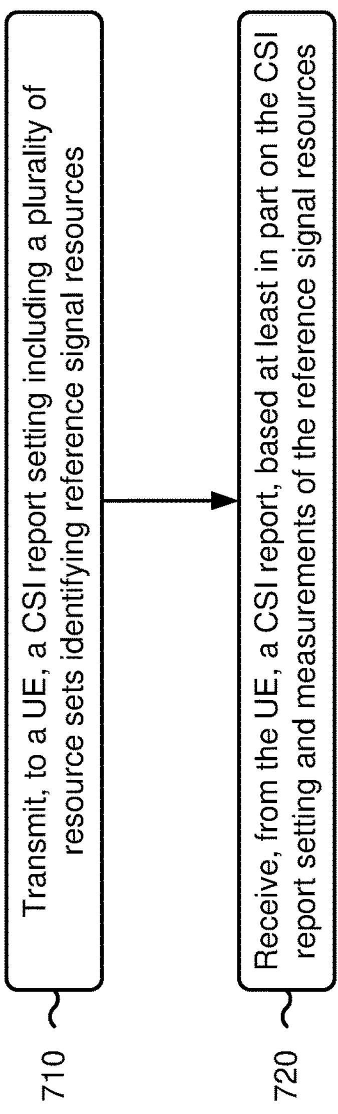

FIG. 7 is a diagram illustrating an example process 700 performed, for example, by a base station, in accordance with the present disclosure. Example process 700 is an example where the base station (e.g., base station 110) performs operations associated with using reference signals for beam blockage prediction.

As shown in FIG. 7, in some aspects, process 700 may include transmitting, to a UE, a CSI report setting including a plurality of resource sets identifying reference signal resources (block 710). For example, the base station (e.g., using communication manager 150 and/or transmission component 904, depicted in FIG. 9) may transmit, to a UE, a CSI report setting including a plurality of resource sets identifying reference signal resources, wherein each resource set is associated with a repetition parameter set to on, off, or non-presented, as described above.

As further shown in FIG. 7, in some aspects, process 700 may include receiving, from the UE, a CSI report, based at least in part on the CSI report setting and measurements of the reference signal resources (block 720). For example, the base station (e.g., using communication manager 150 and/or reception component 902, depicted in FIG. 9) may receive, from the UE, a CSI report, based at least in part on the CSI report setting and measurements of the reference signal resources, wherein the CSI report includes, for the plurality of resource sets, measurement information associated with at least one of a L1 RSRP parameter, an L1 SINR parameter, a CQI parameter, or a rank indicator parameter, wherein the measurement information identifies a rate at which a parameter is improving or dropping, as described above.

Process 700 may include additional aspects, such as any single aspect or any combination of aspects described below and/or in connection with one or more other processes described elsewhere herein.

In a first aspect, the plurality of resource sets includes at least one of an NZP-CSI-RS Resource Set or an SSB Resource Set.

In a second aspect, alone or in combination with the first aspect, the repetition parameter is set to on and wherein one or more reception beams, associated with the reference signal resources, are based at least in part on a plurality of transmission configuration indicator states.

In a third aspect, alone or in combination with one or more of the first and second aspects, the repetition parameter is set to on and wherein the measurement information, for a resource set of the plurality of resource sets, is based at least in part on a plurality of different reception beams corresponding to one or more transmission configuration indicator states associated with different reference signal resources.

In a fourth aspect, alone or in combination with one or more of the first through third aspects, a receive beam is based at least in part on a plurality of transmission configuration indicator states, of a reference signal resource of the reference signal resources, and further comprising receiving a report of a transmission configuration indicator state, of the plurality of transmission configuration indicator states, of the determined receive beam.

In a fifth aspect, alone or in combination with one or more of the first through fourth aspects, the repetition parameter is set to off or non-presented and wherein a reception beam is based at least in part on one or more transmission configuration indicator states.

In a sixth aspect, alone or in combination with one or more of the first through fifth aspects, the repetition parameter is set to off or non-presented and wherein the measurement information, for a resource set of the plurality of resource sets, is based at least in part on a reception beam corresponding to one or more transmission configuration indicator states associated with the reference signal resources.

In a seventh aspect, alone or in combination with one or more of the first through sixth aspects, a reception beam is selected, from a plurality of transmission configuration indicator states configured for a resource set, and further comprising receiving a report of a transmission configuration indicator state of the selected reception beam.

In an eighth aspect, alone or in combination with one or more of the first through seventh aspects, the measurement information is consolidated across the reference signal resources of the plurality of resource sets.

In a ninth aspect, alone or in combination with one or more of the first through eighth aspects, consolidated measurement information is based at least in part on an analytical function with the measurement information as an input, wherein the analytical function includes at least one of an averaging function, a weighting function, or a filtering function.

In a tenth aspect, alone or in combination with one or more of the first through ninth aspects, consolidated measurement information is based at least in part on an application of an artificial intelligence model or a machine learning model with the measurement information as an input.

In an eleventh aspect, alone or in combination with one or more of the first through tenth aspects, the artificial intelligence model or the machine learning model is a neural network based model.

In a twelfth aspect, alone or in combination with one or more of the first through eleventh aspects, a selected transmission configuration indicator state associated with a selected reception beam is another input to the artificial intelligence or machine learning model.

In a thirteenth aspect, alone or in combination with one or more of the first through twelfth aspects, process 700 includes transmitting, in connection with the CSI report setting, information identifying a transmission configuration indicator state to identify a reception beam associated with the reference signal resources.

In a fourteenth aspect, alone or in combination with one or more of the first through thirteenth aspects, process 700 includes transmitting, in connection with the CSI report setting, radio resource control signaling identifying a quantity of parameter rates, that the UE is to report in the measurement information, or dynamic signaling updating the quantity of parameter rates that the UE is to report in the measurement information.

In a fifteenth aspect, alone or in combination with one or more of the first through fourteenth aspects, process 700 includes transmitting, in connection with the CSI report setting, information indicating or updating a reporting scheme for consolidating the measurement information.

In a sixteenth aspect, alone or in combination with one or more of the first through fifteenth aspects, the plurality of resource sets is associated with one or more CSI resource configurations associated with the CSI report setting.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
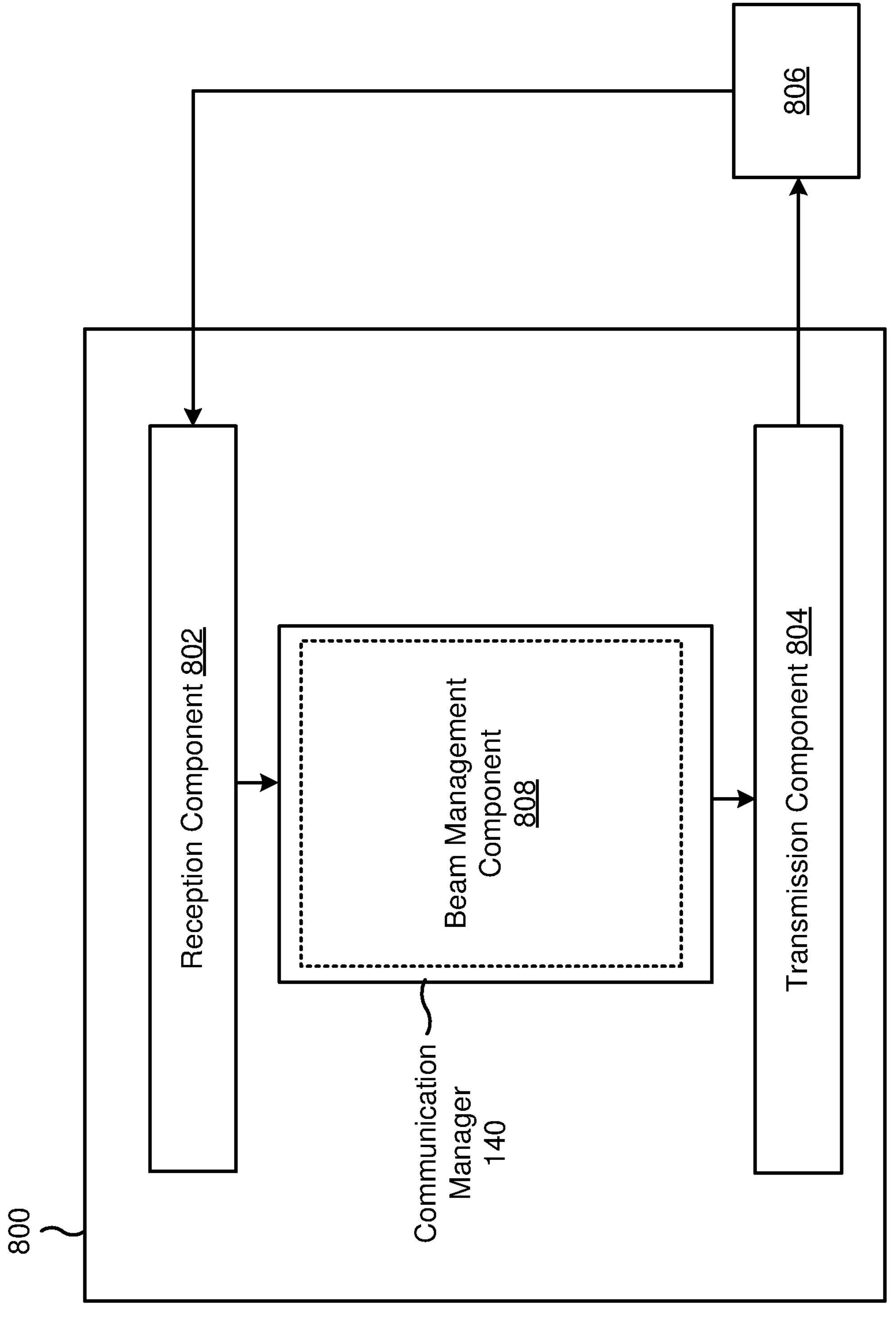
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a beam management component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a CSI report setting including a plurality of resource sets identifying reference signal resources, wherein each resource set is associated with a repetition parameter set to on, off, or non-presented. The transmission component 804 may transmit a CSI report, based at least in part on the CSI report setting and measurements of the reference signal resources, wherein the CSI report includes, for the plurality of resource sets, measurement information associated with at least one of a L1 RSRP parameter, an L1 SINR parameter, a CQI parameter, or a rank indicator parameter, wherein the measurement information identifies a rate at which a parameter is improving or dropping.

The reception component 802 may receive, in connection with the CSI report setting, information identifying a transmission configuration indicator state to determine a reception beam associated with the reference signal resources. The reception component 802 may receive, in connection with the CSI report setting, radio resource control signaling identifying a quantity of parameter rates to report in the measurement information, or dynamic signaling updating the quantity of parameter rates to report in the measurement information. The reception component 802 may receive, in connection with the CSI report setting, information indicating or updating a reporting scheme for consolidating the measurement information. The beam management component 808 may generate a CSI report based at least in part on a set of measurement of a set of beams and/or select a beam based at least in part on the set of measurements of the set of beams.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
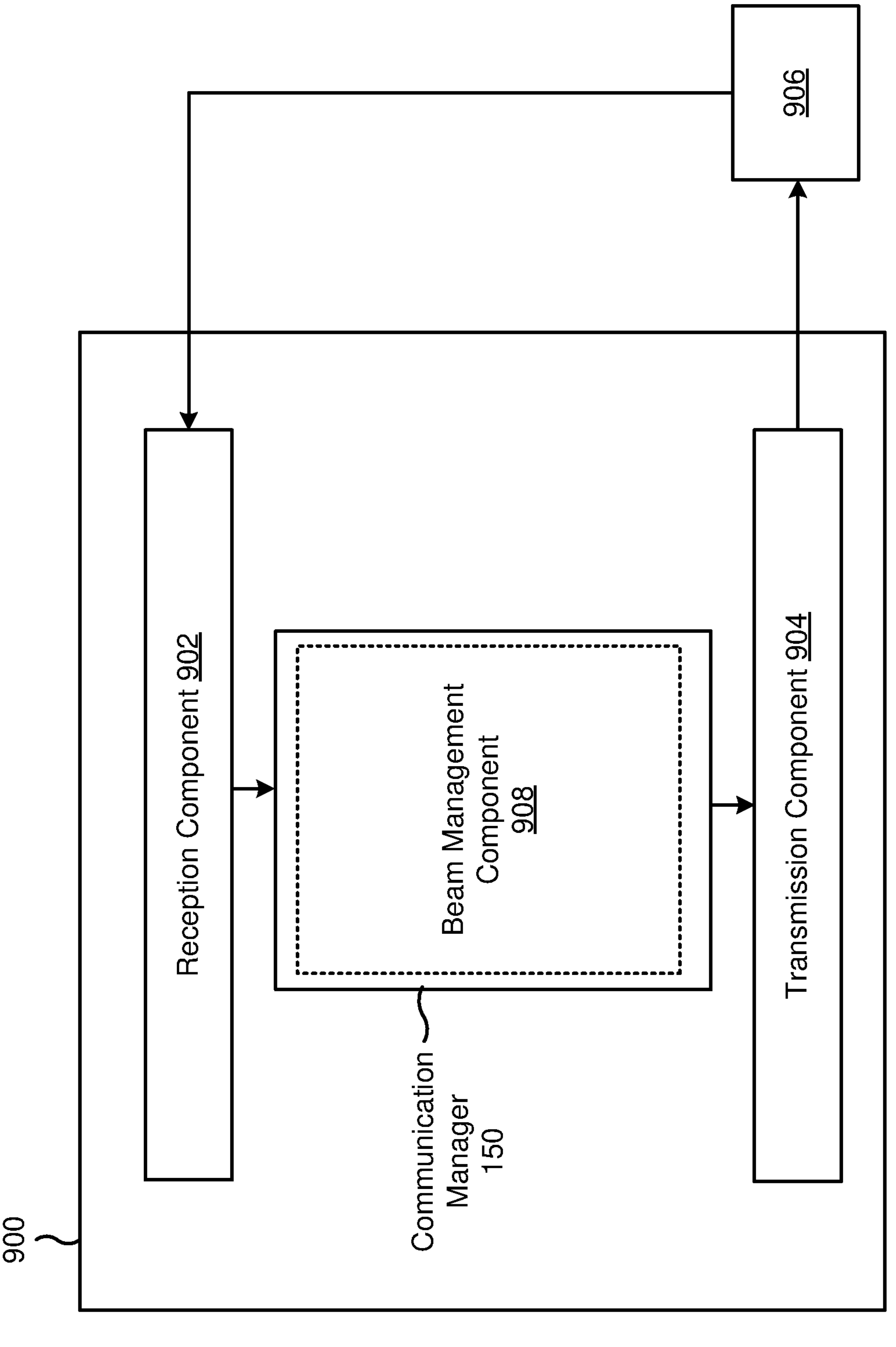

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a beam management component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, a CSI report setting including a plurality of resource sets identifying reference signal resources, wherein each resource set is associated with a repetition parameter set to on, off, or non-presented. The reception component 902 may receive, from the UE, a CSI report, based at least in part on the CSI report setting and measurements of the reference signal resources, wherein the CSI report includes, for the plurality of resource sets, measurement information associated with at least one of a L1 RSRP parameter, an L1 SINR parameter, a CQI parameter, or a rank indicator parameter, wherein the measurement information identifies a rate at which a parameter is improving or dropping.

The transmission component 904 may transmit, in connection with the CSI report setting, information identifying a transmission configuration indicator state to identify a reception beam associated with the reference signal resources. The transmission component 904 may transmit, in connection with the CSI report setting, radio resource control signaling identifying a quantity of parameter rates, that the UE is to report in the measurement information, or dynamic signaling updating the quantity of parameter rates that the UE is to report in the measurement information. The transmission component 904 may transmit, in connection with the CSI report setting, information indicating or updating a reporting scheme for consolidating the measurement information. The beam management component 908 may predict a beam blockage and configure communication in accordance with the beam blockage.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a channel state information (CSI) report setting including a plurality of resource sets identifying reference signal resources, wherein each resource set is associated with a repetition parameter set to on, off, or non-presented; and transmitting a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

Aspect 2: The method of Aspect 1, wherein the plurality of resource sets includes at least one of a non-zero power CSI reference signal resource set (NZP-CSI-RS Resource Set) or a synchronization signal block resource set (SSB Resource Set).

Aspect 3: The method of any of Aspects 1 to 2, wherein the repetition parameter is set to on and wherein the UE is configured with a plurality of transmission configuration indicator states from which to determine one or more reception beams associated with the reference signal resources.

Aspect 4: The method of any of Aspects 1 to 3, wherein the repetition parameter is set to on and wherein the measurement information, for a resource set of the plurality of resource sets, is based at least in part on a plurality of different reception beams corresponding to one or more transmission configuration indicator states associated with different reference signal resources.

Aspect 5: The method of any of Aspects 1 to 4, wherein the UE is configured to determine a receive beam based at least in part on a plurality of transmission configuration indicator states of a reference signal resource of the reference signal resources, and further comprising: reporting a transmission configuration indicator state, of the plurality of transmission configuration indicator states, of the determined receive beam.

Aspect 6: The method of any of Aspects 1 to 5, wherein the repetition parameter is set to off or non-presented and wherein the UE is configured with one or more transmission configuration indicator states from which to determine a reception beam associated with the reference signal resources.

Aspect 7: The method of any of Aspects 1 to 6, wherein the repetition parameter is set to off or non-presented and wherein the measurement information, for a resource set of the plurality of resource sets, is based at least in part on a reception beam corresponding to one or more transmission configuration indicator states associated with the reference signal resources.

Aspect 8: The method of any of Aspects 1 to 7, wherein the UE is configured to select, from a plurality of transmission configuration indicator states configured for a resource set, a reception beam; and further comprising: reporting a transmission configuration indicator state of the selected reception beam.

Aspect 9: The method of any of Aspects 1 to 8, wherein the UE is configured to consolidate the measurement information across the reference signal resources of the plurality of resource sets.

Aspect 10: The method of Aspect 9, wherein consolidated measurement information is generated based at least in part on an analytical function with the measurement information as an input, wherein the analytical function includes at least one of an averaging function, a weighting function, or a filtering function.

Aspect 11: The method of Aspect 10, wherein consolidated measurement information is generated based at least in part on an application of an artificial intelligence model or a machine learning model with the measurement information as an input.

Aspect 12: The method of Aspect 11, wherein the artificial intelligence model or the machine learning model is a neural network based model.

Aspect 13: The method of any of Aspects 11 to 12, wherein a selected transmission configuration indicator state associated with a selected reception beam is another input to the artificial intelligence or machine learning model.

Aspect 14: The method of any of Aspects 1 to 13, further comprising: receiving, in connection with the CSI report setting, information identifying a transmission configuration indicator state to determine a reception beam associated with the reference signal resources.

Aspect 15: The method of any of Aspects 1 to 14, further comprising: receiving, in connection with the CSI report setting, radio resource control signaling identifying a quantity of parameter rates to report in the measurement information, or dynamic signaling updating the quantity of parameter rates to report in the measurement information.

Aspect 16: The method of any of Aspects 1 to 15, further comprising: receiving, in connection with the CSI report setting, information indicating or updating a reporting scheme for consolidating the measurement information.

Aspect 17: The method of any of Aspects 1 to 16, wherein the plurality of resource sets is associated with one or more CSI resource configurations associated with the CSI report setting.

Aspect 18: A method of wireless communication performed by a base station, comprising: transmitting, to a user equipment (UE), a channel state information (CSI) report setting including a plurality of resource sets identifying reference signal resources, wherein each resource set is associated with a repetition parameter set to on, off, or non-presented; and receiving, from the UE, a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

Aspect 19: The method of Aspect 18, wherein the plurality of resource sets includes at least one of a non-zero power CSI reference signal resource set (NZP-CSI-RS Resource Set) or a synchronization signal block resource set (SSB Resource Set).

Aspect 20: The method of any of Aspects 18 to 19, wherein the repetition parameter is set to on and wherein one or more reception beams, associated with the reference signal resources, are based at least in part on a plurality of transmission configuration indicator states.

Aspect 21: The method of any of Aspects 18 to 20, wherein the repetition parameter is set to on and wherein the measurement information, for a resource set of the plurality of resource sets, is based at least in part on a plurality of different reception beams corresponding to one or more transmission configuration indicator states associated with different reference signal resources.

Aspect 22: The method of any of Aspects 18 to 21, wherein a receive beam is based at least in part on a plurality of transmission configuration indicator states, of a reference signal resource of the reference signal resources; and further comprising: receiving a report of a transmission configuration indicator state, of the plurality of transmission configuration indicator states, of the determined receive beam.

Aspect 23: The method of any of Aspects 18 to 22, wherein the repetition parameter is set to off or non-presented and wherein a reception beam is based at least in part on one or more transmission configuration indicator states.

Aspect 24: The method of any of Aspects 18 to 23, wherein the repetition parameter is set to off or non-presented and wherein the measurement information, for a resource set of the plurality of resource sets, is based at least in part on a reception beam corresponding to one or more transmission configuration indicator states associated with the reference signal resources.

Aspect 25: The method of any of Aspects 18 to 24, wherein a reception beam is selected, from a plurality of transmission configuration indicator states configured for a resource set; and further comprising: receiving a report of a transmission configuration indicator state of the selected reception beam.

Aspect 26: The method of any of Aspects 18 to 25, wherein the measurement information is consolidated across the reference signal resources of the plurality of resource sets.

Aspect 27: The method of Aspect 26, wherein consolidated measurement information is based at least in part on an analytical function with the measurement information as an input, wherein the analytical function includes at least one of an averaging function, a weighting function, or a filtering function.

Aspect 28: The method of Aspect 27, wherein consolidated measurement information is based at least in part on an application of an artificial intelligence model or a machine learning model with the measurement information as an input.

Aspect 29: The method of Aspect 28, wherein the artificial intelligence model or the machine learning model is a neural network based model.

Aspect 30: The method of any of Aspects 28 to 29, wherein a selected transmission configuration indicator state associated with a selected reception beam is another input to the artificial intelligence or machine learning model.

Aspect 31: The method of any of Aspects 18 to 30, further comprising: transmitting, in connection with the CSI report setting, information identifying a transmission configuration indicator state to identify a reception beam associated with the reference signal resources.

Aspect 32: The method of any of Aspects 18 to 31, further comprising: transmitting, in connection with the CSI report setting, radio resource control signaling identifying a quantity of parameter rates, that the UE is to report in the measurement information, or dynamic signaling updating the quantity of parameter rates that the UE is to report in the measurement information.

Aspect 33: The method of any of Aspects 18 to 32, further comprising: transmitting, in connection with the CSI report setting, information indicating or updating a reporting scheme for consolidating the measurement information.

Aspect 34: The method of any of Aspects 18 to 33, wherein the plurality of resource sets is associated with one or more CSI resource configurations associated with the CSI report setting.

Aspect 35: An apparatus for wireless communication at a device, comprising a processor; memory coupled with the processor; and instructions stored in the memory and executable by the processor to cause the apparatus to perform the method of one or more of Aspects 1-17.

Aspect 36: A device for wireless communication, comprising a memory and one or more processors coupled to the memory, the one or more processors configured to perform the method of one or more of Aspects 1-17.

Aspect 37: An apparatus for wireless communication, comprising at least one means for performing the method of one or more of Aspects 1-17.

Aspect 38: A non-transitory computer-readable medium storing code for wireless communication, the code comprising instructions executable by a processor to perform the method of one or more of Aspects 1-17.

Aspect 39: A non-transitory computer-readable medium storing a set of instructions for wireless communication, the set of instructions comprising one or more instructions that, when executed by one or more processors of a device, cause the device to perform the method of one or more of Aspects 1-17.

Aspect 40: An apparatus for wireless communication at a device, comprising a processor; memory coupled with the processor; and instructions stored in the memory and executable by the processor to cause the apparatus to perform the method of one or more of Aspects 18-34.

Aspect 41: A device for wireless communication, comprising a memory and one or more processors coupled to the memory, the one or more processors configured to perform the method of one or more of Aspects 18-34.

Aspect 42: An apparatus for wireless communication, comprising at least one means for performing the method of one or more of Aspects 18-34.

Aspect 43: A non-transitory computer-readable medium storing code for wireless communication, the code comprising instructions executable by a processor to perform the method of one or more of Aspects 18-34.

Aspect 44: A non-transitory computer-readable medium storing a set of instructions for wireless communication, the set of instructions comprising one or more instructions that, when executed by one or more processors of a device, cause the device to perform the method of one or more of Aspects 18-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive a channel state information (CSI) report setting including a plurality of resource sets identifying reference signal resources, wherein each resource set is associated with a repetition parameter set to on, off, or non-presented; and transmit a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

2. The UE of claim 1, wherein the plurality of resource sets includes at least one of a non-zero power CSI reference signal resource set (NZP-CSI-RS Resource Set) or a synchronization signal block resource set (SSB Resource Set).

3. The UE of claim 1, wherein the repetition parameter is set to on and wherein the UE is configured with a plurality of transmission configuration indicator states from which to determine one or more reception beams associated with the reference signal resources.

4. The UE of claim 1, wherein the repetition parameter is set to on and wherein the measurement information, for a resource set of the plurality of resource sets, is based at least in part on a plurality of different reception beams corresponding to one or more transmission configuration indicator states associated with different reference signal resources.

5. The UE of claim 1, wherein the UE is configured to determine a receive beam based at least in part on a plurality of transmission configuration indicator states of a reference signal resource of the reference signal resources, and wherein the UE is further configured to:

report a transmission configuration indicator state, of the plurality of transmission configuration indicator states, of the determined receive beam.

6. The UE of claim 1, wherein the repetition parameter is set to off or non-presented and wherein the UE is configured with one or more transmission configuration indicator states from which to determine a reception beam associated with the reference signal resources.

7. The UE of claim 1, wherein the repetition parameter is set to off or non-presented and wherein the measurement information, for a resource set of the plurality of resource sets, is based at least in part on a reception beam corresponding to one or more transmission configuration indicator states associated with the reference signal resources.

8. The UE of claim 1, wherein the UE is configured to select, from a plurality of transmission configuration indicator states configured for a resource set, a reception beam; and wherein the UE is further configured to:

report a transmission configuration indicator state of the selected reception beam.

9. The UE of claim 1, wherein the UE is configured to consolidate the measurement information across the reference signal resources of the plurality of resource sets.

10. The UE of claim 9, wherein consolidated measurement information is generated based at least in part on an analytical function with the measurement information as an input, wherein the analytical function includes at least one of an averaging function, a weighting function, or a filtering function.

11. The UE of claim 10, wherein consolidated measurement information is generated based at least in part on an application of an artificial intelligence model or a machine learning model with the measurement information as an input.

12. The UE of claim 11, wherein the artificial intelligence model or the machine learning model is a neural network based model.

13. The UE of claim 11, wherein a selected transmission configuration indicator state associated with a selected reception beam is another input to the artificial intelligence model or machine learning model.

14. The UE of claim 1, wherein the one or more processors are further configured to:

receive, in connection with the CSI report setting, information identifying a transmission configuration indicator state to determine a reception beam associated with the reference signal resources.

15. The UE of claim 1, wherein the one or more processors are further configured to:

receive, in connection with the CSI report setting, radio resource control signaling identifying a quantity of parameter rates to report in the measurement information, or dynamic signaling updating the quantity of parameter rates to report in the measurement information.

16. The UE of claim 1, wherein the one or more processors are further configured to:

receive, in connection with the CSI report setting, information indicating or updating a reporting scheme for consolidating the measurement information.

17. The UE of claim 1, wherein the plurality of resource sets is associated with one or more CSI resource configurations associated with the CSI report setting.

18. A base station for wireless communication, comprising:

a memory; and one or more processors, coupled to the memory, configured to:

transmit, to a user equipment (UE), a channel state information (CSI) report setting including a plurality of resource sets identifying reference signal resources, wherein each resource set is associated with a repetition parameter set to on, off, or non-presented; and receive, from the UE, a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

19. The base station of claim 18, wherein the plurality of resource sets includes at least one of a non-zero power CSI reference signal resource set (NZP-CSI-RS Resource Set) or a synchronization signal block resource set (SSB Resource Set).

20. The base station of claim 18, wherein the repetition parameter is set to on and wherein one or more reception beams, associated with the reference signal resources, are based at least in part on a plurality of transmission configuration indicator states.

21. The base station of claim 18, wherein the repetition parameter is set to on and wherein the measurement information, for a resource set of the plurality of resource sets, is based at least in part on a plurality of different reception beams corresponding to one or more transmission configuration indicator states associated with different reference signal resources.

22. The base station of claim 18, wherein a receive beam is based at least in part on a plurality of transmission configuration indicator states, of a reference signal resource of the reference signal resources; and wherein the base station is further configured to:

receive a report of a transmission configuration indicator state, of the plurality of transmission configuration indicator states, of the receive beam.

23. The base station of claim 18, wherein the repetition parameter is set to off or non-presented and wherein a reception beam is based at least in part on one or more transmission configuration indicator states.

24. The base station of claim 18, wherein the repetition parameter is set to off or non-presented and wherein the measurement information, for a resource set of the plurality of resource sets, is based at least in part on a reception beam corresponding to one or more transmission configuration indicator states associated with the reference signal resources.

25. The base station of claim 18, wherein a reception beam is selected, from a plurality of transmission configuration indicator states configured for a resource set; and wherein the base station is further configured to:

receive a report of a transmission configuration indicator state of the selected reception beam.

26. The base station of claim 18, wherein the measurement information is consolidated across the reference signal resources of the plurality of resource sets.

27. The base station of claim 26, wherein consolidated measurement information is based at least in part on an analytical function with the measurement information as an input, wherein the analytical function includes at least one of an averaging function, a weighting function, or a filtering function.

28. The base station of claim 27, wherein consolidated measurement information is based at least in part on an application of an artificial intelligence model or a machine learning model with the measurement information as an input.

29. A method of wireless communication performed by a user equipment (UE), comprising:

receiving a channel state information (CSI) report setting including a plurality of resource sets identifying reference signal resources, wherein each resource set is associated with a repetition parameter set to on, off, or non-presented; and transmitting a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

30. A method of wireless communication performed by a base station, comprising:

transmitting, to a user equipment (UE), a channel state information (CSI) report setting including a plurality of resource sets identifying reference signal resources, wherein each resource set is associated with a repetition parameter set to on, off, or non-presented; and receiving, from the UE, a CSI report, based at least in part on the CSI report setting and measurements of the reference signal resources, wherein the CSI report includes, for the plurality of resource sets, measurement information associated with at least one of a layer 1 (L1) reference signal received power (RSRP) parameter, an L1 signal-to-interference-and-noise ratio (SINR) parameter, a channel quality indicator (CQI) parameter, or a rank indicator parameter, wherein the measurement information identifies a rate at which a parameter is improving or dropping.

* * * * *